(12) United States Patent
Bolster et al.

(10) Patent No.: US 10,809,465 B2
(45) Date of Patent: *Oct. 20, 2020

(54) TELECOMMUNICATIONS MODULE

(71) Applicant: CommScope Technologies LLC, Hickory, NC (US)

(72) Inventors: Kristofer Bolster, Jordan, MN (US); Soutsada Vongseng, Chanhassen, MN (US)

(73) Assignee: CommScope Technologies LLC, Hickory, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/223,852

(22) Filed: Dec. 18, 2018

(65) Prior Publication Data

US 2019/0384014 A1 Dec. 19, 2019

Related U.S. Application Data

(63) Continuation of application No. 15/751,741, filed as application No. PCT/US2016/047653 on Aug. 18, 2016, now Pat. No. 10,162,131.

(Continued)

(51) Int. Cl.
*G02B 6/38* (2006.01)
*G02B 6/44* (2006.01)

(52) U.S. Cl.
CPC ......... *G02B 6/3887* (2013.01); *G02B 6/4452* (2013.01); *G02B 6/4454* (2013.01);
(Continued)

(58) Field of Classification Search
CPC .. G02B 6/3887; G02B 6/4454; G02B 6/4457; G02B 6/4466; G02B 6/4478
See application file for complete search history.

(56) References Cited

U.S. PATENT DOCUMENTS

| 4,650,933 A | 3/1987 | Benda et al. |
| 4,768,961 A | 9/1988 | Lau |

(Continued)

FOREIGN PATENT DOCUMENTS

| DE | 41 30 706 A1 | 3/1993 |
| DE | 202 01 170 U1 | 5/2002 |

(Continued)

OTHER PUBLICATIONS

Extended European Search Report for Application No. 16839857.6 dated Mar. 19, 2019.

(Continued)

*Primary Examiner* — Daniel Petkovsek
(74) *Attorney, Agent, or Firm* — Merchant & Gould P.C.

(57) ABSTRACT

A telecommunications module defines an interior with separate right and left chambers. An optical component is housed within the left chamber. Signal input and output locations are exposed to the right chamber. The right chamber allows excess fiber to accumulate without bending in a radius smaller than a minimum bend radius. A dual-layered cable management structure is positioned within the right chamber that defines a lower cable-wrapping level and a separate upper cable-wrapping level. The upper cable-wrapping level is defined by a removable cable retainer mounted on a spool defining the lower-cable wrapping level. Cabling carrying the input and output signals are passed between the right and left chambers before and after being processed by the optical component.

13 Claims, 17 Drawing Sheets

Related U.S. Application Data

(60) Provisional application No. 62/208,371, filed on Aug. 21, 2015.

(52) U.S. Cl.
CPC ......... *G02B 6/4457* (2013.01); *G02B 6/4466* (2013.01); *G02B 6/4471* (2013.01); *G02B 6/4478* (2013.01)

(56) References Cited

U.S. PATENT DOCUMENTS

| | | |
|---|---|---|
| 4,770,639 A | 9/1988 | Lau |
| 4,797,114 A | 1/1989 | Lau |
| 4,820,200 A | 4/1989 | Lau |
| 4,840,568 A | 6/1989 | Burroughs et al. |
| 5,189,410 A | 2/1993 | Kosugi et al. |
| 5,199,878 A | 4/1993 | Dewey et al. |
| 5,214,673 A | 5/1993 | Morgenstern et al. |
| 5,317,663 A | 5/1994 | Beard et al. |
| 5,339,379 A | 8/1994 | Kutsch et al. |
| 5,363,465 A | 11/1994 | Korkowski et al. |
| 5,393,249 A | 2/1995 | Morgenstern et al. |
| 5,432,875 A | 7/1995 | Korkowski et al. |
| 5,467,062 A | 11/1995 | Burroughs |
| 5,497,444 A | 3/1996 | Wheeler |
| 5,582,525 A | 12/1996 | Louwagie et al. |
| 5,613,030 A | 3/1997 | Hoffer et al. |
| 5,627,925 A | 5/1997 | Alferness et al. |
| 5,685,741 A | 11/1997 | Dewey et al. |
| 5,694,511 A | 12/1997 | Pimpinella et al. |
| 5,701,380 A | 12/1997 | Larson et al. |
| 5,717,810 A | 2/1998 | Wheeler |
| 5,946,440 A | 8/1999 | Puetz |
| 6,116,961 A | 9/2000 | Henneberger et al. |
| 6,208,796 B1 | 3/2001 | Vigliaturo |
| 6,226,111 B1 | 5/2001 | Chang et al. |
| 6,263,136 B1 | 7/2001 | Jennings et al. |
| 6,301,424 B1 | 10/2001 | Hwang |
| 6,307,998 B2 | 10/2001 | Vigliaturo |
| 6,328,608 B1 | 12/2001 | Olson et al. |
| 6,363,183 B1 | 3/2002 | Koh |
| 6,363,198 B1 | 3/2002 | Braga et al. |
| 6,370,294 B1 | 4/2002 | Pfeiffer et al. |
| 6,418,262 B1 | 7/2002 | Puetz et al. |
| 6,424,781 B1 | 7/2002 | Puetz et al. |
| 6,511,330 B1 | 1/2003 | Norris |
| 6,532,332 B2 | 3/2003 | Solheid et al. |
| 6,535,682 B1 | 3/2003 | Puetz et al. |
| 6,554,652 B1 | 4/2003 | Musolf et al. |
| 6,556,738 B2 | 4/2003 | Pfeiffer et al. |
| 6,556,763 B1 | 4/2003 | Puetz et al. |
| 6,579,014 B2 | 6/2003 | Melton et al. |
| 6,591,051 B2 | 7/2003 | Solheid et al. |
| 6,599,024 B2 | 7/2003 | Zimmel |
| 6,600,866 B2 | 7/2003 | Gatica et al. |
| 6,614,953 B2 | 9/2003 | Strasser et al. |
| 6,616,459 B2 | 9/2003 | Norris |
| 6,632,106 B2 | 10/2003 | Musolf et al. |
| RE38,311 E | 11/2003 | Wheeler |
| 6,647,197 B1 | 11/2003 | Marrs et al. |
| 6,668,108 B1 | 12/2003 | Helkey et al. |
| 6,688,780 B2 | 2/2004 | Duran |
| 6,719,382 B2 | 4/2004 | Sucharczuk et al. |
| 6,760,531 B1 | 7/2004 | Solheid et al. |
| 6,761,594 B2 | 7/2004 | Johnsen et al. |
| 6,810,193 B1 | 10/2004 | Müller |
| 6,822,874 B1 | 11/2004 | Marler |
| 6,824,312 B2 | 11/2004 | McClellan et al. |
| 6,830,465 B2 | 12/2004 | Norris et al. |
| 6,832,035 B1 | 12/2004 | Daoud et al. |
| 6,848,952 B2 | 2/2005 | Norris |
| 6,850,685 B2 | 2/2005 | Tinucci et al. |
| 6,863,446 B2 | 3/2005 | Ngo |
| 6,885,798 B2 | 4/2005 | Zimmel |
| 6,890,187 B2 | 5/2005 | Norris |
| 6,912,349 B2 | 6/2005 | Clark et al. |
| 6,937,807 B2 | 8/2005 | Franklin et al. |
| 6,983,095 B2 | 1/2006 | Reagan et al. |
| 7,029,322 B2 | 4/2006 | Ernst et al. |
| 7,118,284 B2 | 10/2006 | Nakajima et al. |
| 7,142,764 B2 | 11/2006 | Allen et al. |
| 7,190,874 B1 | 3/2007 | Barth et al. |
| 7,194,181 B2 | 3/2007 | Holmberg et al. |
| 7,218,827 B2 | 5/2007 | Vongseng et al. |
| 7,233,731 B2 | 6/2007 | Solheid et al. |
| 7,303,220 B2 | 12/2007 | Zellak |
| 7,310,474 B2 | 12/2007 | Kanasaki et al. |
| 7,331,473 B2 | 2/2008 | Smith et al. |
| 7,333,606 B1 | 2/2008 | Swam et al. |
| 7,346,254 B2 | 3/2008 | Kramer et al. |
| 7,359,611 B1 | 4/2008 | Kaplan |
| 7,376,323 B2 | 5/2008 | Zimmel et al. |
| 7,400,813 B2 | 7/2008 | Zimmel |
| 7,418,181 B2 | 8/2008 | Zimmel et al. |
| 7,453,706 B2 | 11/2008 | Clark et al. |
| 7,470,068 B2 | 12/2008 | Kahle et al. |
| 7,495,931 B2 | 2/2009 | Clark et al. |
| 7,606,459 B2 | 10/2009 | Zimmel et al. |
| 7,636,507 B2 | 12/2009 | Lu et al. |
| 7,853,112 B2 | 12/2010 | Zimmel et al. |
| 7,912,336 B2 | 3/2011 | Zimmel |
| 8,346,045 B2 | 1/2013 | Zimmel et al. |
| 8,824,850 B2 | 9/2014 | Garcia et al. |
| 9,116,342 B2 | 8/2015 | Cooke |
| 9,851,524 B2 | 12/2017 | Vongseng et al. |
| 10,162,131 B2 * | 12/2018 | Bolster ............... G02B 6/4452 |
| 2005/0232551 A1 | 10/2005 | Chang et al. |
| 2005/0232565 A1 | 10/2005 | Heggestad et al. |
| 2005/0276562 A1 | 12/2005 | Battey et al. |
| 2007/0036503 A1 | 2/2007 | Solheid et al. |
| 2007/0147765 A1 | 6/2007 | Gniadek et al. |
| 2009/0022468 A1 | 1/2009 | Zimmel |
| 2013/0114937 A1 | 5/2013 | Zimmel et al. |
| 2014/0086545 A1 * | 3/2014 | Solheid ............... G02B 6/4453 385/135 |
| 2014/0259602 A1 | 9/2014 | Thompson |
| 2014/0334790 A1 | 11/2014 | Zhang |
| 2015/0131998 A1 | 5/2015 | Kowalczyk et al. |
| 2015/0234141 A1 | 8/2015 | Bolster et al. |
| 2017/0293100 A1 | 10/2017 | Solheid et al. |

FOREIGN PATENT DOCUMENTS

| | | |
|---|---|---|
| EP | 0 730 177 A2 | 9/1996 |
| EP | 0 828 356 A2 | 3/1998 |
| EP | 1 092 996 A2 | 4/2001 |
| EP | 1 107 031 A1 | 6/2001 |
| EP | 1 179 745 A2 | 11/2004 |
| EP | 1 473 578 A2 | 11/2004 |
| EP | 1 852 722 A2 | 11/2007 |
| GB | 2 300 978 A | 11/1996 |
| GB | 2 537 767 A | 10/2016 |
| JP | 2012-527653 A | 11/2012 |
| TW | 260754 B | 10/1995 |
| WO | 96/36896 | 11/1996 |
| WO | 00/75706 A2 | 12/2000 |
| WO | 02/099528 A1 | 12/2002 |
| WO | 02/103429 A2 | 12/2002 |
| WO | 03/093889 A1 | 11/2003 |
| WO | 2006/127397 A1 | 11/2006 |

OTHER PUBLICATIONS

ADC Telecommunications, Inc., DS3 Digital Signal Cross-Connect (DSX3) System Application Guide, Document No. ADCP-80-323, 1st Edition, Issue 2, Dec. 1996, p. 1-10; p. 1-11.

ADC Telecommunications, Inc., DSX-1 Digital Signal Cross Connect PIX-DSX-1—Fifth Edition, dated Oct. 1994, 36 Pages.

ADC Telecommunications, Inc., DSX-3 Digital Signal Cross-Connect, Doc. No. 274, dated Oct. 2004, 65 pp.

ADC Telecommunications, Inc., OmniReach FTTP Solutions, Doc. No. 1276550, dated May 2004, 12 pp.

(56) References Cited

OTHER PUBLICATIONS

ADC Telecommunications, Inc., PxPlus™ Digital Signal Cross-Connect, dated Jan. 1997, 12 Pages.
Pending U.S. Appl. No. 11/138,063; filed May 25, 2005, entitled "Fiber Optic Splitter Module".
Pending U.S. Appl. No. 11/138,889; filed May 25, 2005, entitled "Fiber Optic Adapter Module".
Pending U.S. Appl. No. 11/354,297, Zimmel et al, filed Feb. 13, 2006.
Prosecution History of U.S. Appl. No. 10/980,978 (OA Dec. 15, 2005; Resp. Jun. 15, 2006; OA Sep. 6, 2006; Resp. Mar. 6, 2007; OA Jun. 1, 2007).
Prosecution History of U.S. Appl. No. 11/138,063 (OA Dec. 27, 2006; Resp. Apr. 27, 2007; OA Jul. 30, 2007).
Prosecution History of U.S. Appl. No. 11/138,889 (OA Dec. 14, 2005; Resp. Jun. 14, 2006; OA Sep. 11, 2006; Resp. Mar. 12, 2007; OA Jun. 13, 2007).
Prosecution History of U.S. Appl. No. 11/215,837 (OA Jul. 28, 2006; Resp. Oct. 30, 2006; OA Jan. 26, 2007; Resp. Apr. 26, 2007; Notice of Allowance dated Aug. 2, 2007).
International Search Report and Written Opinion of the International Searching Authority for corresponding International Patent Application No. PCT/US2016/047653 dated Oct. 31, 2016, 8 pages.

\* cited by examiner

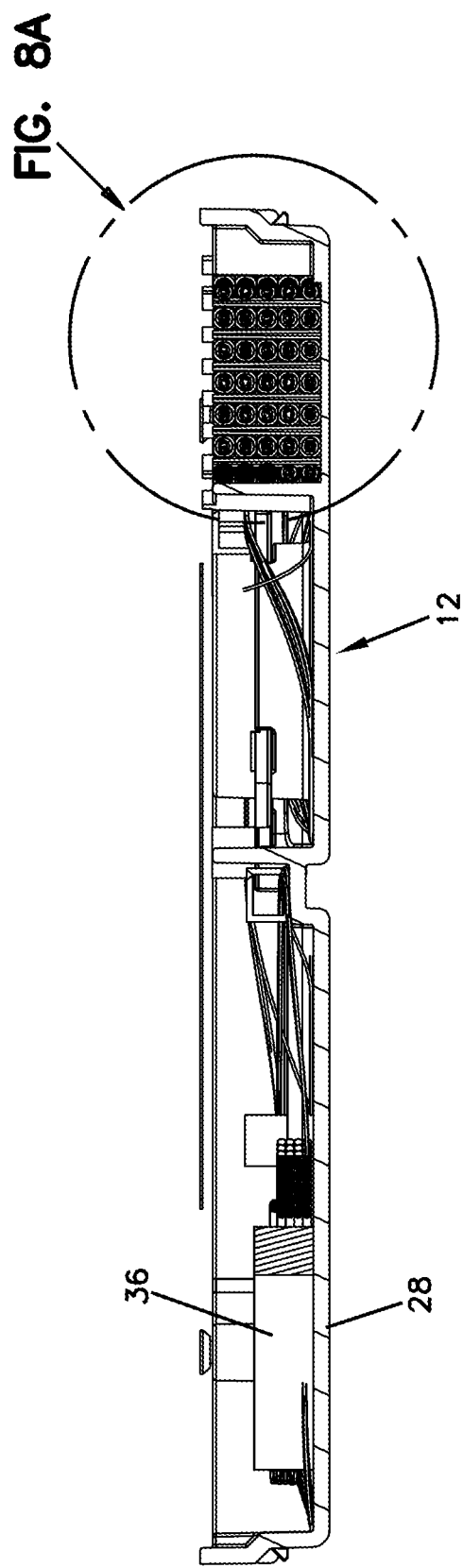

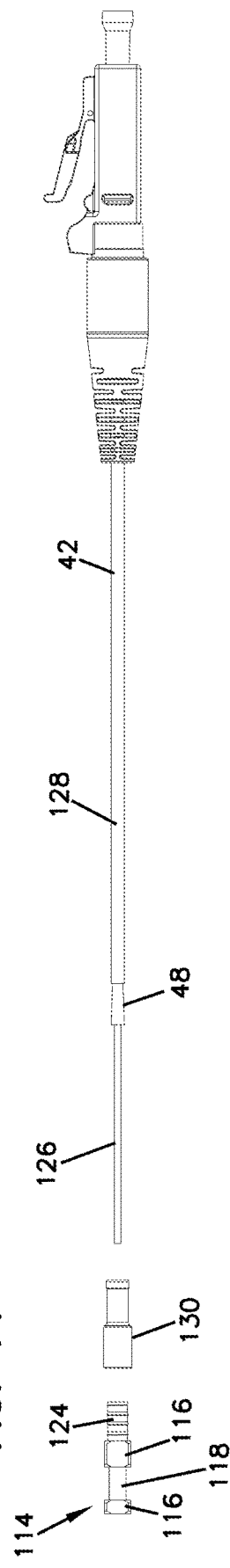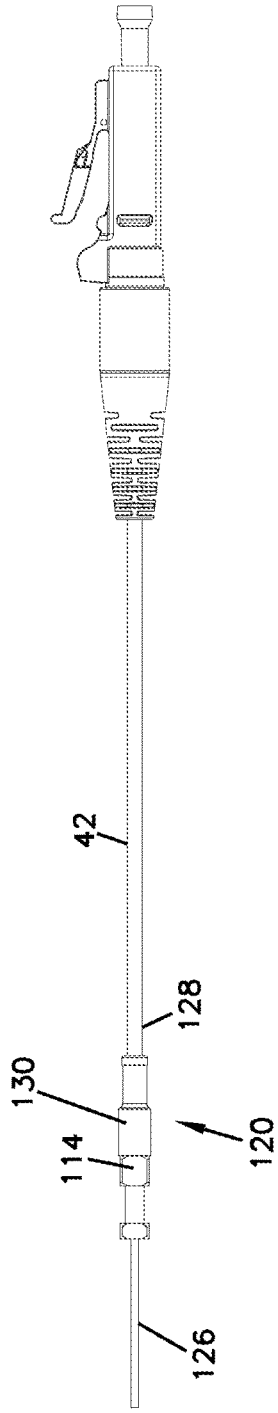

TELECOMMUNICATIONS MODULE

CROSS-REFERENCE TO RELATED APPLICATION

This application is a continuation of U.S. patent application Ser. No. 15/751,741, filed on Feb. 9, 2018, now U.S. Pat. No. 10,162,131; which is a U.S. National Stage Application of PCT/US2016/047653, filed on Aug. 18, 2016, which claims the benefit of U.S. Patent Application Ser. No. 62/208,371, filed on Aug. 21, 2015, the disclosures of which are incorporated herein by reference in their entireties. To the extent appropriate, a claim of priority is made to each of the above disclosed applications.

FIELD

The present disclosure generally relates to fiber optic telecommunications equipment. More specifically, the present disclosure relates to removably mounted modular elements for housing fiber optic telecommunications equipment.

BACKGROUND

In fiber optic telecommunications systems, it is common for optical fibers of transmission cables to be split into multiple strands, either by optical splitting of a signal carried by a single stranded cable or by fanning out the individual fibers of a multi-strand cable. Further, when such systems are installed, it is known to provide excess capacity in the installations to support future growth and utilization of the fibers. Often in these installations, modules including splitters or fanouts are used to provide the connection between transmission fibers and customer fibers. To reduce the cost and complexity of the initial installation and still provide options for future expansion, a module mounting fixture such as a chassis or a tray capable of mounting multiple modules may be used in such an installation.

While the fixture may accept several modules, the initial installation may only include fewer modules mounted in the fixture, or enough to serve current needs. These fixtures may be configured with limited access to one or more sides, or may be mounted in cramped locations. In addition, some of these fixtures may be pre-configured with the maximum capacity of transmission cables to accommodate and link to modules which may be installed in the future. Since it is desirable to have access to components within the fixture for cleaning during the installation of a new module, some provision or feature of the fixture will desirably permit a user to access and clean the connectors of these pre-connectorized and pre-installed transmission cables.

In fiber-optic telecommunications, it is also common for optical signals of transmission cables to be multiplexed. Wavelength division multiplexing (WDM) is a technology which multiplexes multiple optical carrier signals on a single optical fiber by using different wavelengths of laser light to carry different signals. This allows for a multiplication in capacity, in addition to making it possible to perform bidirectional communications over one strand of fiber.

Improvements in the design of such telecommunications modules are desired.

SUMMARY

The present disclosure relates to a telecommunications assembly including a telecommunications fixture such as a tray and at least one telecommunications module mounted within the tray. Within an interior of each of the modules is located a fiber optic component. In one embodiment, the fiber optic component may be a fiber optic splitter. In another embodiment, the fiber optic component may be a fiber optic division multiplexer/demultiplexer. The module may include one or more signal input locations and one or more signal output locations. In certain embodiments, the signal input locations may be adjacent the signal output locations, and the cabling extending from the signal input locations to the fiber optic component and then to the signal output locations from the fiber optic component may utilize the same cable management features within the module housing. When the module is used as a fiber optic division multiplexer/demultiplexer module, the multiplexer/demultiplexer, as a receiver, is configured to demultiplex multiple optical carrier signals carried by the single input optical fiber into different wavelengths of laserlight as customer output signals. As a transmitter, the multiplexer/demultiplexer is configured to multiplex the customer signals, which are different wavelengths of laserlight, and combine them into a single optical fiber to be outputted from the module.

According to another aspect of the present disclosure, the module comprises a housing including a main housing portion defining an interior formed by a first sidewall, a second sidewall, a bottom wall, a front wall, and a rear wall, the housing further including a removable cover mounted to the main housing portion to define a top wall. The interior defines a right chamber separated from a left chamber. A fiber optic component is housed within the left chamber. A signal input location for receiving an input signal to be processed by the fiber optic component and a signal output location for exiting an output signal processed by the fiber optic component are both exposed to the right chamber, wherein both the signal input location and the signal output location are defined by the front wall, wherein a cable carrying the input signal is fixed adjacent the signal input location via a crimp assembly, and a cable carrying the output signal is fixed adjacent the signal output location via a crimp assembly, wherein an excess fiber length formed when an outer jacket of the cables contracts more than the fiber therewithin due to temperature variations is accommodated by the right chamber to allow the excess fiber length to accumulate without bending in a radius smaller than a minimum bend radius. A cable management structure is positioned within the right chamber, the cable management structure being a dual-layered cable management structure defining a lower cable-wrapping level and a separate upper cable-wrapping level, wherein the upper cable-wrapping level is defined by a removable cable retainer that is mounted on a spool defining the lower-cable wrapping level, the dual layered cable management structure including both the cable carrying the input signal and the cable carrying the output signal wrapped therearound for cable management. The cable carrying the input signal and the cable carrying the output signal are passed between the right chamber and the left chamber before and after being processed by the fiber optic component, respectively, wherein at least one of the rear wall, the first sidewall, and the second sidewall defines a curved portion for providing bend radius protection to the cables carrying the input and output signals within the module.

BRIEF DESCRIPTION OF THE DRAWINGS

The accompanying drawings, which are incorporated in and constitute a part of the description, illustrate several aspects of the inventive features and together with the detailed description, serve to explain the principles of the disclosure. A brief description of the drawings is as follows:

FIG. 8 is cross-sectional view taken along line 8-8 of FIG. 7;

FIG. 14 illustrates an exploded view of an example of a crimp assembly (i.e., furcation tube assembly) that can be used with the output pigtails of the module of FIGS. 1-13;

FIG. 15 illustrates the crimp assembly of FIG. 14 in an assembled configuration;

DETAILED DESCRIPTION

Figure 1:
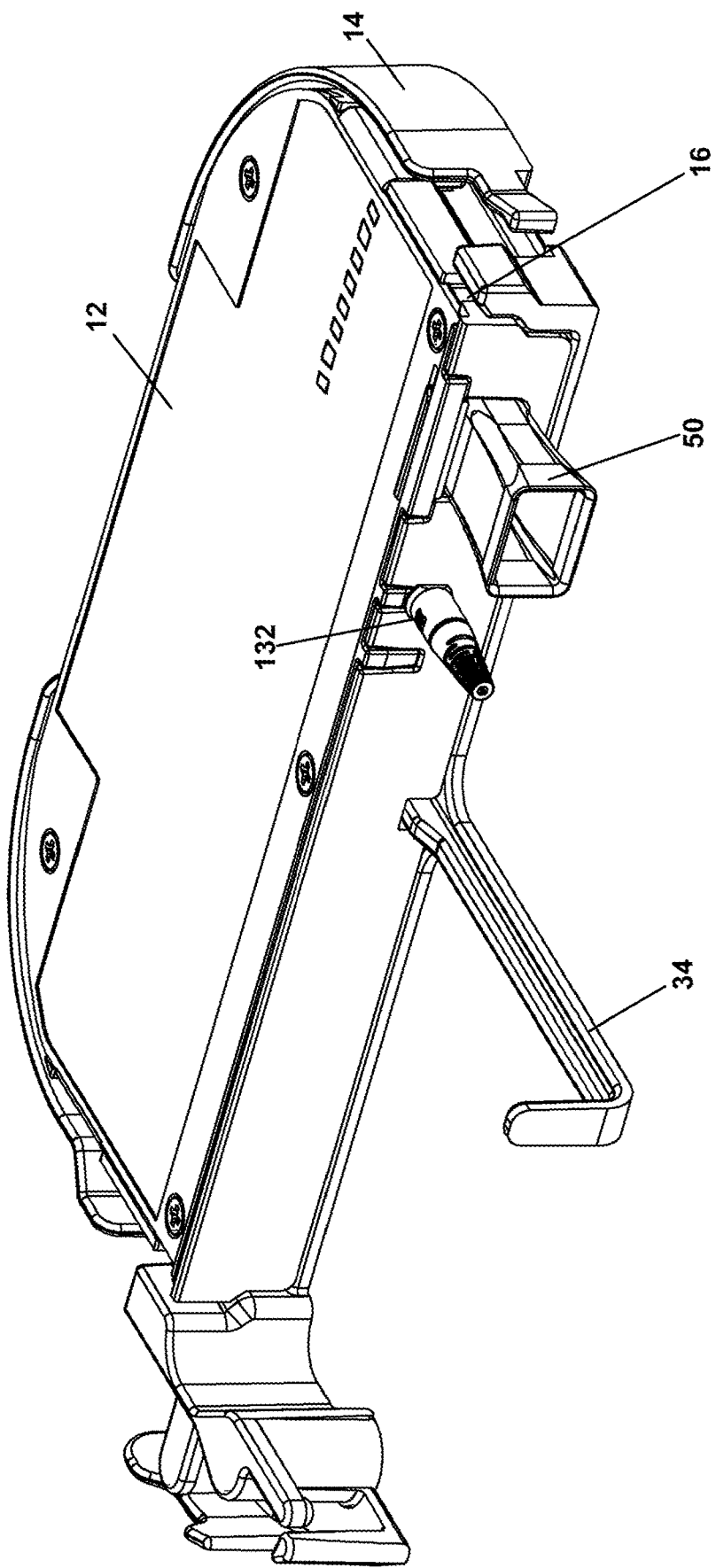
FIG. 1 is a front perspective view of a telecommunications assembly including a telecommunications module having features that are examples of inventive aspects in accordance with the present disclosure mounted within a telecommunications fixture in the form of a tray.

Reference will now be made in detail to exemplary aspects of the present disclosure which are illustrated in the accompanying drawings. Wherever possible, the same reference numbers will be used throughout the drawings to refer to the same or similar parts.

FIGS. 1-4 illustrate a telecommunications assembly 10 including a telecommunications module 12 having features that are examples of inventive aspects in accordance with the present disclosure mounted within a telecommunications fixture in the form of a tray 14. The depicted fixture in the form of a tray 14 may be mounted to other telecommunications fixtures such as chassis, etc.

In the given embodiment, the telecommunications module 12 defines notches 16 on a right sidewall 18 and a left sidewall 20 of a main housing portion 22 of the module housing 24 for receiving elastic ramped tabs 26 provided on the tray 14 for mounting the module 12 to the tray 14 with a snap-fit interlock.

A bottom wall 28 defined by the module main housing portion 22 also includes a cutout 30 extending in a front-to-back direction for accommodating a center divider 32 of the tray 14. The center divider 32 of the tray 14 extends all the way across the tray 14 and transitions into a cable management finger 34 that protrudes outwardly from the front of the tray 14.

It should be noted that although the module 12 of the present disclosure is depicted as being mounted on a telecommunications tray 14, the module 12 may be utilized in other types of fixtures, and the depicted tray 14 is only one example of such a fixture.

FIGS. 5-13 illustrate the telecommunications module 12 having features that are examples of inventive aspects in accordance with the present disclosure. Since one of the telecommunications equipment housed by the module is a fiber optic splitter 36, the telecommunications module 12 may also be referred to herein as a fiber optic splitter module 12. It should be noted that an optical splitter 36 is only one example of an optical component that may be housed within the module 12 of the present disclosure, and in other embodiments, the module 12 may be configured to house other types of optical equipment such as fan-outs, wavelength division multiplexer/demultiplexers, combiners, filters, etc. As will be discussed in further detail below, according to certain embodiments, the module 12 may be provided with removable inserts that are customized based on the type of fiber optic equipment that is going to be housed within the module 12 and the corresponding cable routing provided within the module 12. The inserts may be sized and configured to accommodate the different types of fiber optic equipment and may include pre-mounted or pre-molded cable management structures such as radius limiters or spools that are designed in accordance with the cable routing needed for the types of fiber optic equipment provided in the module 12.

Figure 4:
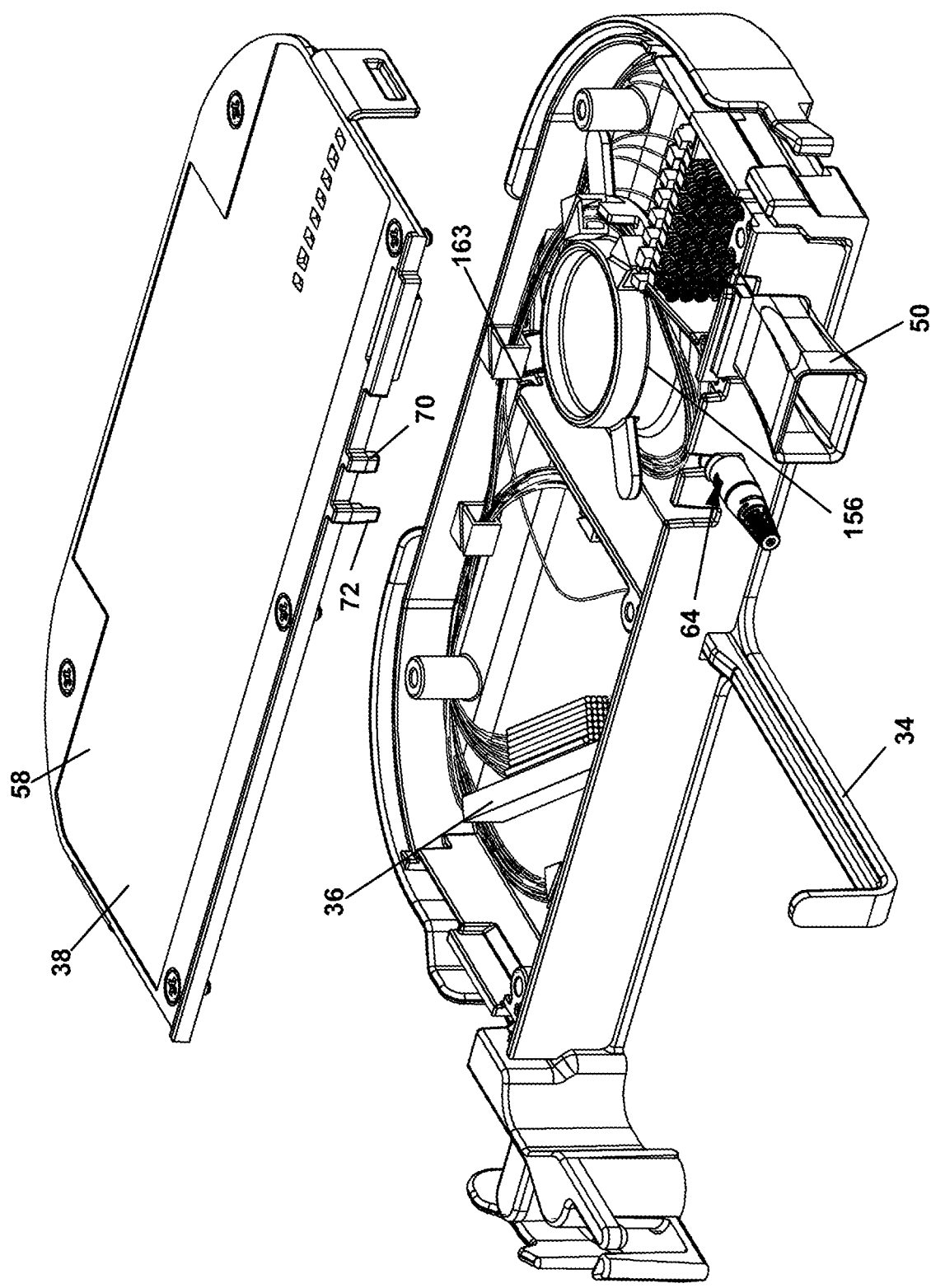
FIG. 4 illustrates the telecommunications assembly of FIG. 1 with the cover of the module removed from the main housing portion of the module housing.

The telecommunications module 12 includes the module housing 24 that is made up of the main housing portion 22 and a removable cover 38 (shown in an exploded configuration in FIG. 4). The cover 38 may be mounted to the module main housing portion 22 via fasteners 40 as shown in FIGS. 4 and 5.

Figures 5, 5A:
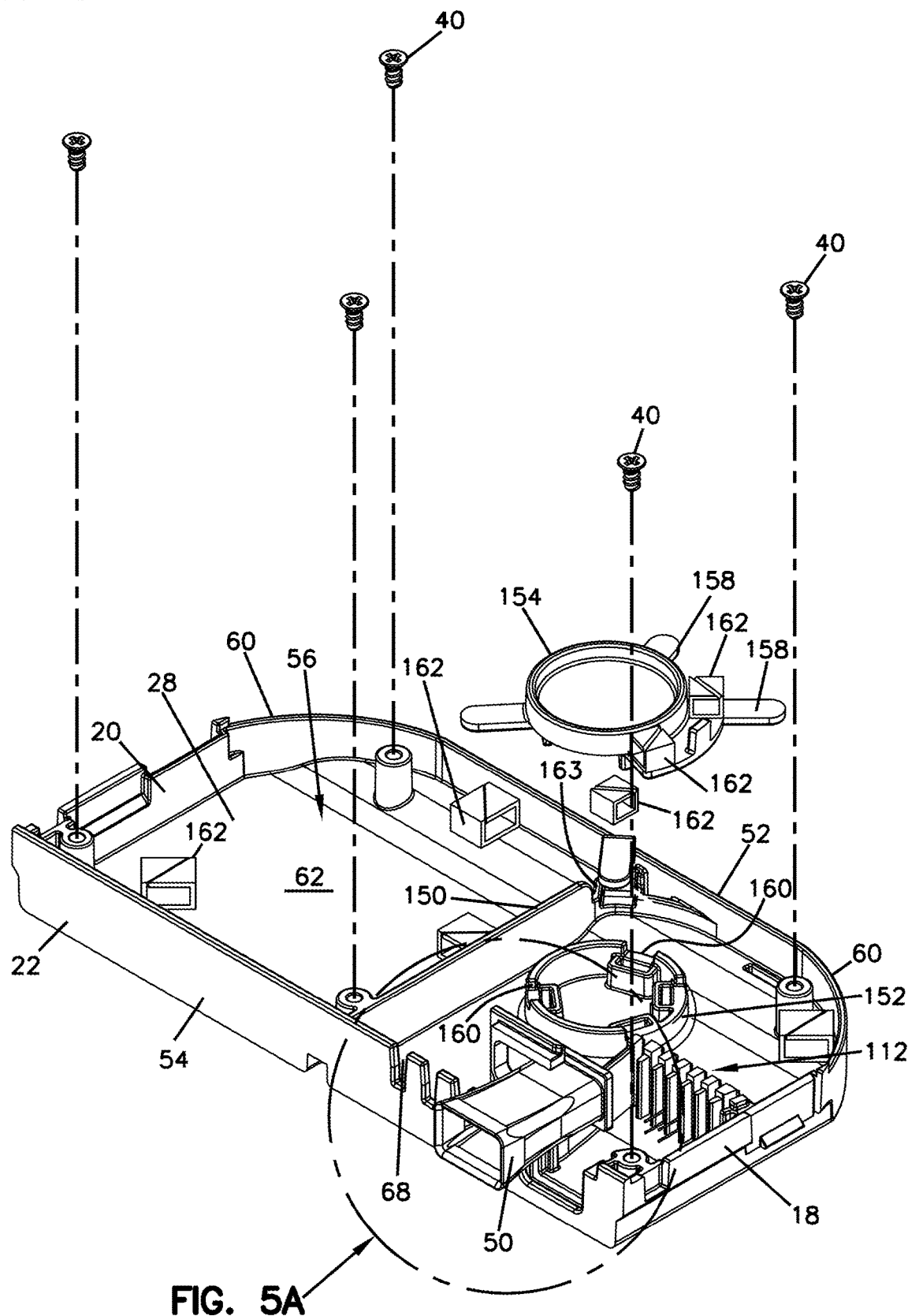
FIG. 5 illustrates the main housing portion of the module housing of FIG. 4 with a number of features exploded from the main housing portion, the module shown without any optical components or associated cabling therein.
FIG. 5A is a close-up view of the cable exit portion of the module of FIG. 5.
Figure 5A:
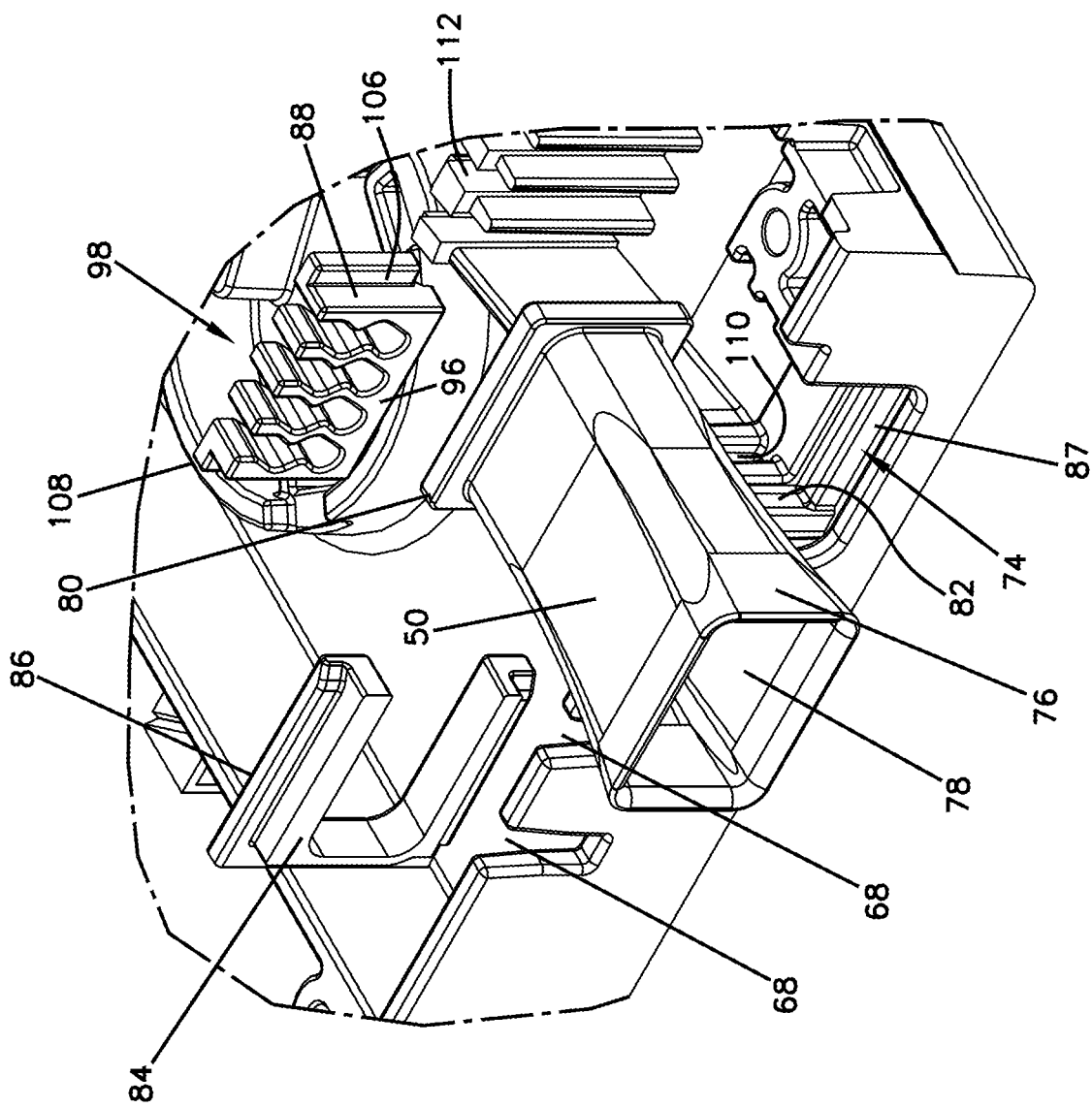

In FIGS. 5 and 5A, the main housing portion 22 of the module housing 24 is shown in an exploded orientation.

Figure 2:
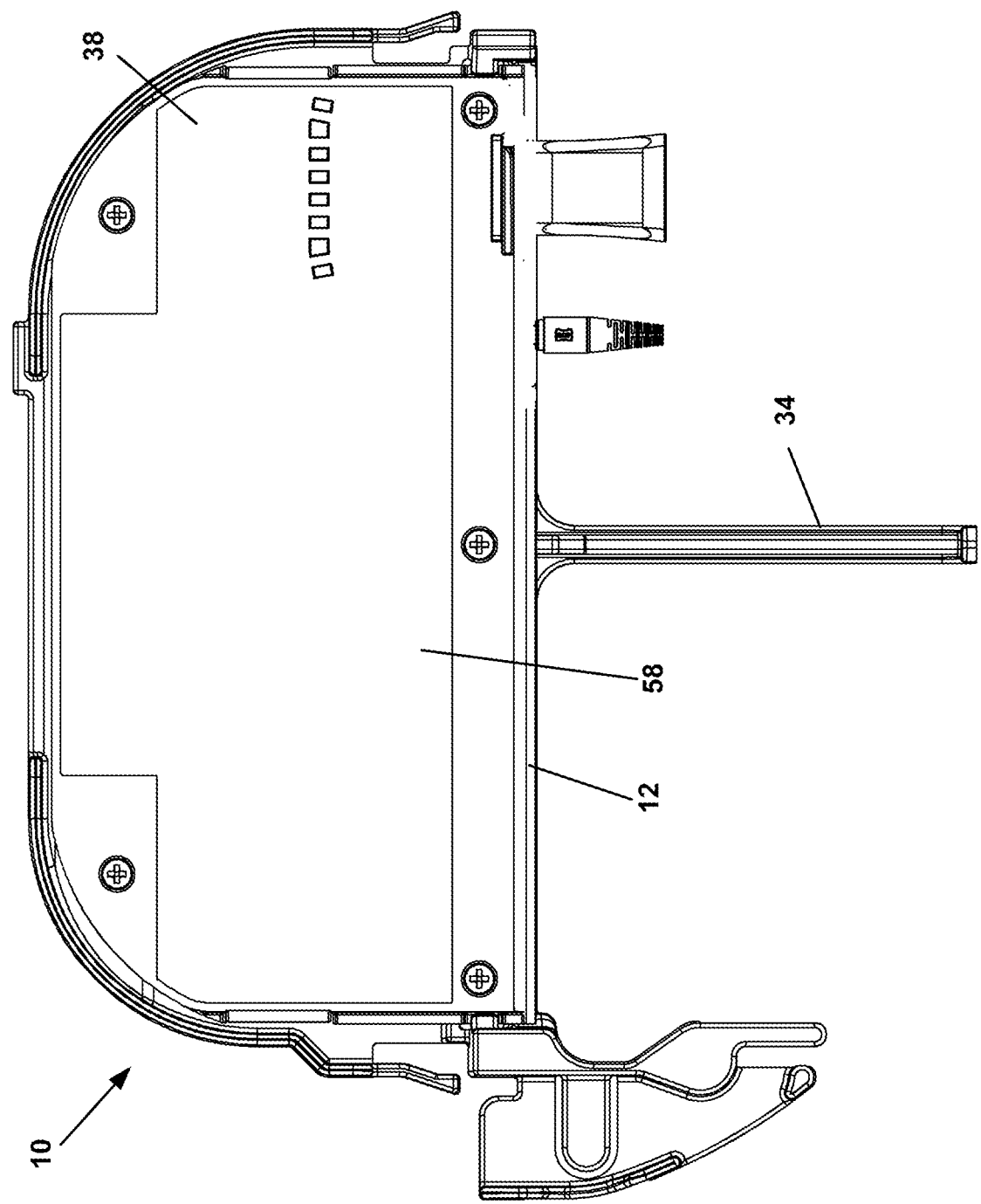
FIG. 2 illustrates the telecommunications assembly of FIG. 1 from a top view.
Figure 3:
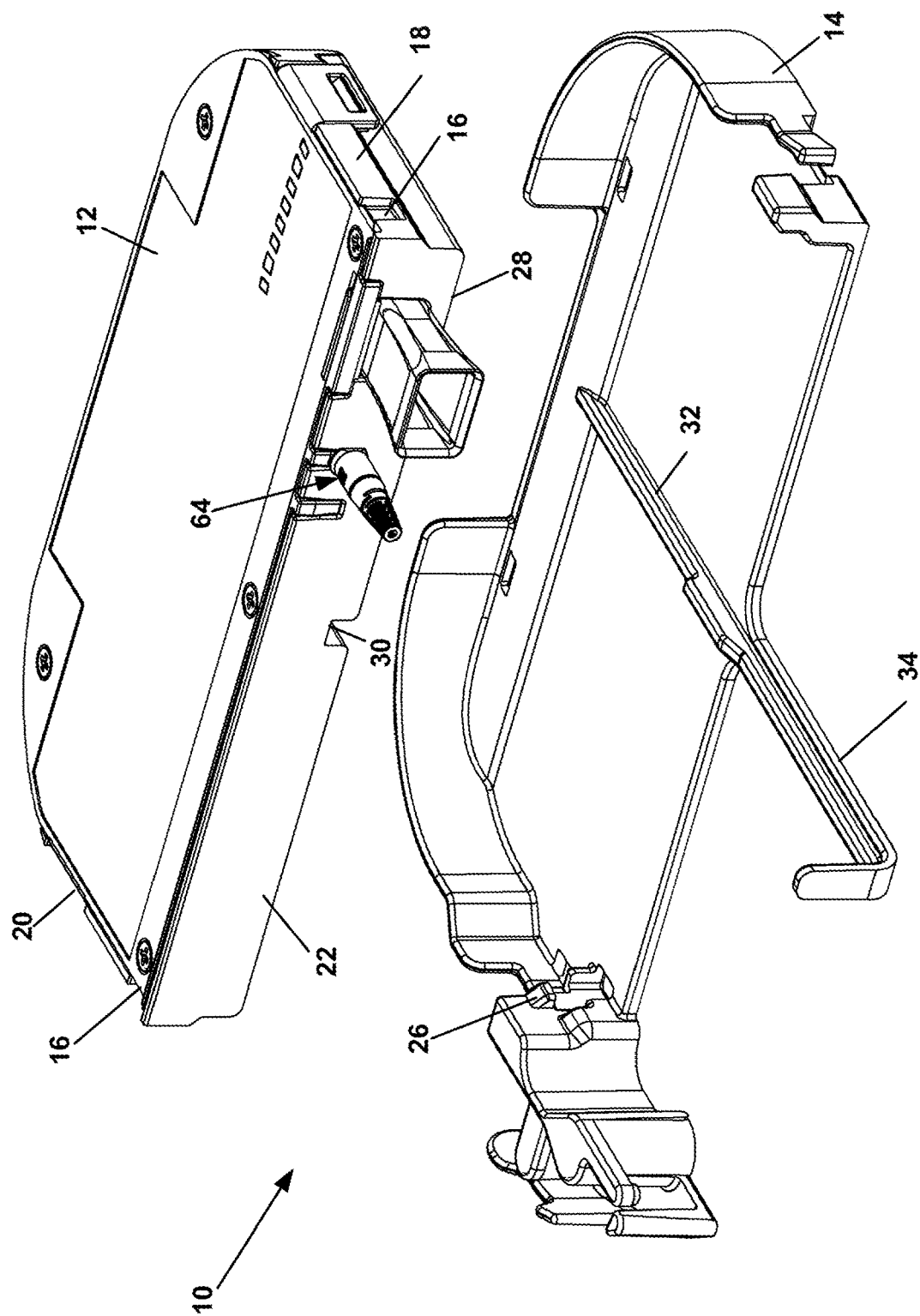
FIG. 3 illustrates the telecommunications assembly of FIG. 1 with the module exploded off the tray.

The main housing portion 22 and the removable cover 38 of the module 12 are illustrated in a fully assembled configuration in FIGS. 1-3. The main housing portion 22 of the module housing 24 is shown without the optical equipment and associated cabling in FIGS. 5, 5A, and 6. In FIGS. 7 and 8, the module 12 is shown fully populated with these features.

Still referring to FIGS. 5-13, in the given embodiment, the module 12 is depicted as being configured to house an optical component in the form of a fiber optic splitter 36. The fiber optic splitter 36 is adapted to power split a first input fiber optic signal entering the module 12 into multiple strands that are output as connectorized pigtails 42 from the module 12. In the embodiment shown, the fiber optic splitter 36 is a 1×32 splitter. As such, the module 12 of the present disclosure is illustrated as outputting 32 output signals via fiber optic pigtails 42 for every input signal entering the module 12. As shown and as will be discussed in further detail, an outer layer (e.g., a strength layer 44) of the cabling 46 carrying the input signal, and an outer layer (e.g., a strength layer 48) of the cabling (e.g., pigtails) 42 carrying the output signals may be fixed to the module housing 24 via crimping so as to still allow the internal fibers to move through the walls of the module housing 24 for accommodating thermal expansion.

Figure 6:
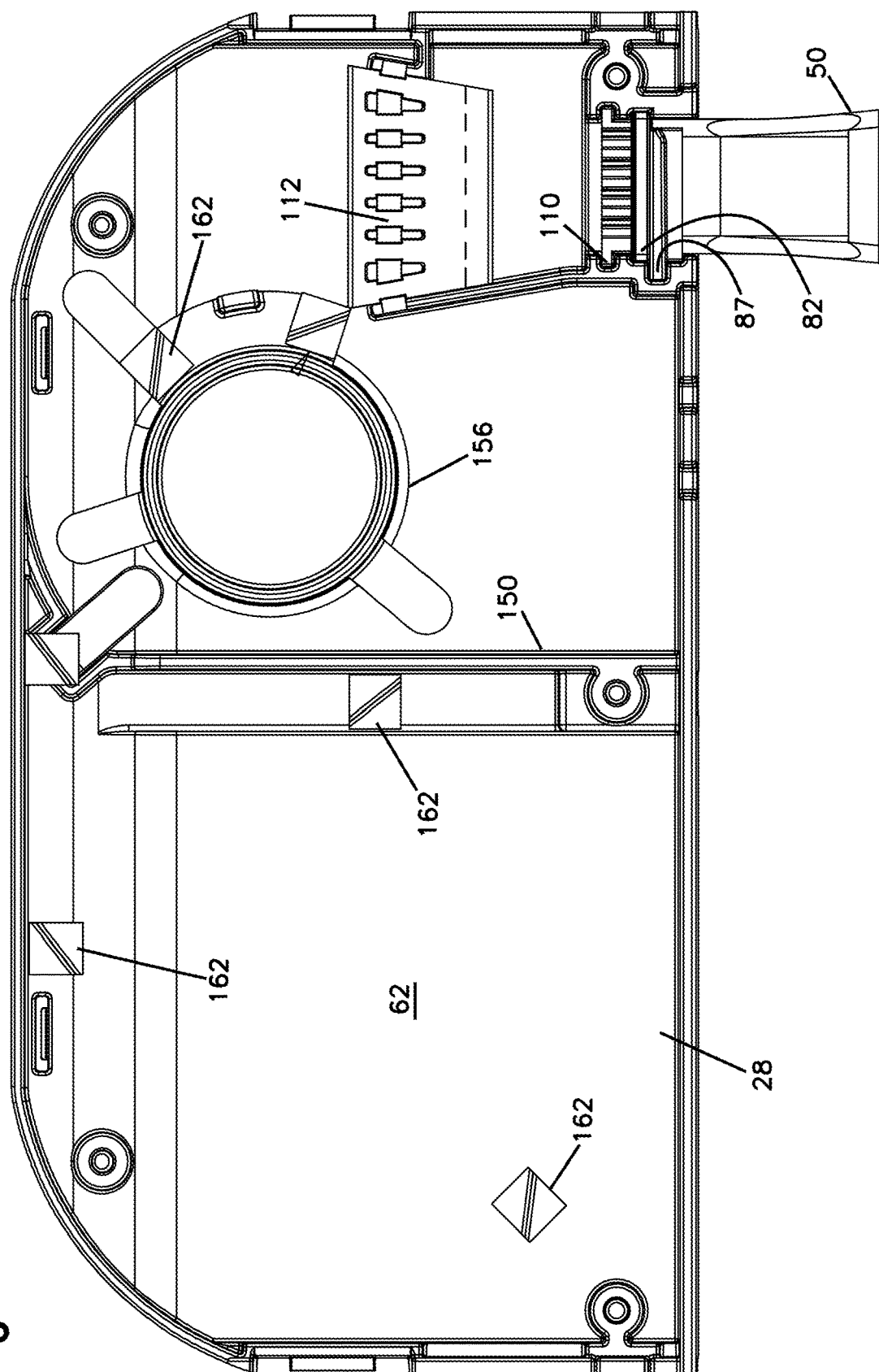
FIG. 6 illustrates the main housing portion of FIG. 5 from a top view wherein all of the features thereof are in an assembled configuration.
Figure 7:
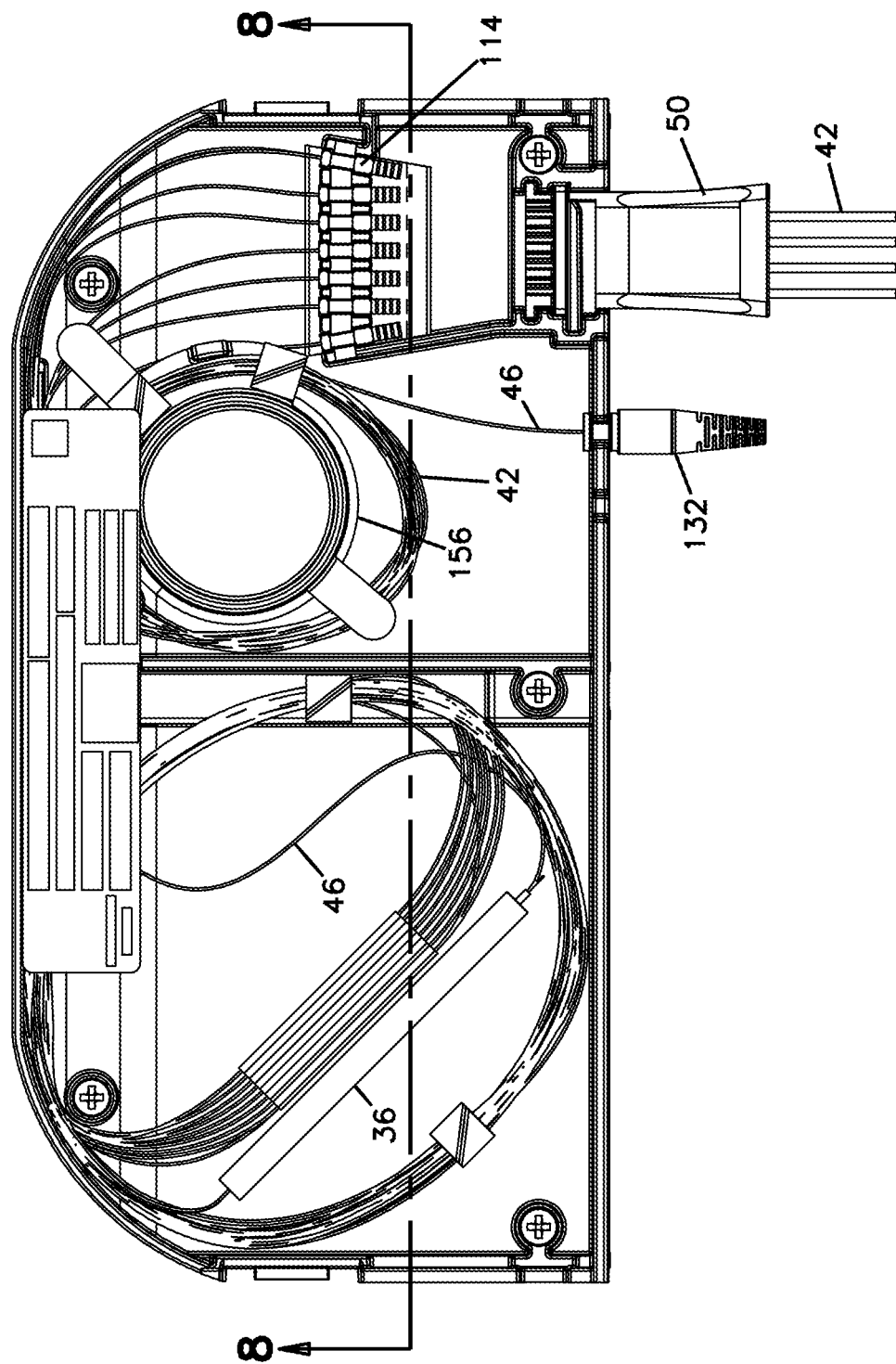
FIG. 7 illustrates the main housing portion of FIG. 5 in a fully populated configuration with the optical component and the cabling therein.

Now referring specifically to FIGS. 5, 5A, and 6, the main housing portion 22 of the housing 24 of the fiber optic splitter module 12 is illustrated. The cover 38 of the fiber optic splitter module housing 24 has been removed, exposing the interior features of the fiber optic splitter module 12 including an example cable routing associated with a splitter 36 within the fiber optic splitter module 12.

The main housing portion 22 defines the bottom wall 28 extending between the right wall 18, the left wall 20, a rear wall 52, and a front wall 54. As noted above, the open side 56 of module main housing 22 is normally closed by a removable cover 38 that defines a top wall 58 of the module housing 24.

Rear wall 52 of main housing portion 22 includes curved portions 60 that are configured to provide bend radius protection and routing guidance to cables 42, 46 within an interior 62 of the module 12. The front wall 54 of module main housing portion 22 is configured to provide the signal input and the signal output locations 64, 66 of the module 12. The depicted module 12 includes two signal input openings 68 at the front wall 54. The signal input openings 68 of the front wall 54 are normally covered by downwardly protruding tabs 70 of the cover 38. The protruding tabs 70 may include breakable portions 72 for exposing one or more of the signal input openings 68 for utilizing the opening as a signal input location 64 (please refer to FIG. 4).

The depicted module 12 also defines a signal output or a cable exit opening 74 at the front wall 54, adjacent the signal input openings 68. The module 12 is configured to receive a bend limiting apparatus 76 at the signal output opening 74 that extends outwardly from the front wall 54. The bend limiting apparatus 76 is in the form of a boot 50 and is configured to provide bend protection to the plurality of pigtails 42 carrying the output signals exiting the module 12.

The boot 50 defines a central opening 78 aligned with the cable exit opening 74 for routing the pigtails 42 out of the module 12. The boot 50 is slidably mounted to main housing portion 22 and is configured to be captured by the cover 38 of module 12 when cover 38 is mounted to main housing portion 22.

According to the depicted embodiment, in order to facilitate placement and/or removal of the flexible boot 50, the cable exit opening 74 defined by the main housing portion 22 is configured such that the boot 50 can be axially slid over the pigtails 42, brought toward the module 12 from an exterior of the module 12, and placed at the cable exit opening 74, wherein a cable passage defined by the central opening 78 of the boot 50 aligns with the cable exit opening 74. In the depicted embodiment, a rear lip or flange 80 of the boot 50 can be inserted through the cable opening 74 and then slidably placed within a first notch 82 defined at the cable opening 74. Once the rear lip 80 of the boot 50 has been placed within the first notch 82, a separate boot retainer 84 in the form of a C-shaped clip is slidably placed over the boot 50 in a direction transverse to the axial direction. The boot retainer 84 defines a flange 86 that is slidably placed within a second notch 87 defined in front of the first notch 82. Once positioned, the flange 86 defined by the boot retainer 84 abuts, on one side, an inner side of the front wall 54 surrounding the cable exit opening 74. And, the flange 86 defined by the boot retainer 84 also abuts, on the opposite side, the lip 80 of the boot 50 to prevent the boot 50 from being pulled out in the axial direction. The cover 38 of the module housing 24 is placed on the main housing portion 22 and captures the boot retainer 84 against the main housing portion 22 to prevent the boot 50 from being pulled out.

According to the depicted embodiment, the fiber optic splitter module also includes at least one insect-infestation prevention device 88 that is configured to be placed at the cable exit opening 74. The insect-infestation prevent device 88 is shown in isolation in FIG. 9. The cover 38 of the module 12 includes structure for capturing the insect-infestation prevention device 88 within the main housing portion 22 of the fiber optic splitter module housing 24, as will be described in further detail.

The insect-infestation prevention device 88 is configured to be mounted adjacent the front cable exit opening 74 of the main housing portion 22, aligning with the boot central opening 78. As shown, the insect-infestation prevention device 88 includes a one-piece molded body 90 defining a top end 92, a bottom end 94, a front end 96, a rear end 98, a right side 100 and a left side 102. The body 90 includes cutouts 104 extending from the top end 92 toward the bottom end 94. The cutouts 104 are configured to receive fiber optic cables in a direction from the top end 92 toward the bottom end 94. In the depicted embodiment, the cutouts 104 each include a zig-zag configuration (a.k.a., an S-shaped configuration). The zig-zag configuration is designed to increase the density of the cables that can be stacked in the cutouts 104. For example, in the depicted embodiment, the zig-zag configuration allows a cutout 104 to accommodate four fiber optic cables stacked on top of each other, whereas straight slots would require a wider footprint for the cable manager or deeper cutouts. In other embodiments, depending upon the density required, the cutouts 104 could have straight slotted configurations.

The angles forming the zig-zag configuration of the cutouts 104 are designed such that, while providing a higher density for the cables, they also preserve bend radius properties of the fibers. When the insect-infestation prevention device 88 is aligned with the boot 50, the cutouts 104 are preferably sized to provide a snug fit with the output cables 42 such that any extra room around the cables 42 is limited to prevent insect-infestation. When less than all of the cutouts 104 or less than the entirety of a cutout 104 is used, the remaining space can be plugged using different types of inserts. For example, according to one embodiment, the remaining space that is not used for outputting a fiber can be plugged using a dummy fiber furcation tube assembly. The dummy fiber furcation tube assembly may include all of the components of a normal live fiber furcation tube assembly except for the fiber itself. An example of a dummy fiber furcation tube assembly is discussed in U.S. Pat. No. 8,824,850, the entire disclosure of which is incorporated herein by reference.

The rear end 98 of the body 90 of the insect-infestation prevention device 88 includes right and left flanges 106, 108. As shown in FIGS. 5, 5A, and 6, the insect-infestation prevention device 88 is slidably mounted at the cable exit opening 74, behind the boot 50, such that the right and left flanges 106, 108 are inserted into a third notch 110 defined adjacent the cable exit opening 74. Once the flanges 106, 108 are within the third notch 110, the front end 96 of the insect-infestation prevention device 88 lies flush with the rear end of the boot 50.

Once the insect-infestation prevention device 88, the boot 50, and the boot retainer 84 are placed on the main housing portion 22, the cover 38 is used to capture these components against the main housing portion 22.

As discussed previously, an outer layer 48 of the cables 42 exiting the module 12 through the boot 50 is fixed to the main housing portion 22 of the module 12 so as to allow expansion of the fiber through the cabling 42 due to thermal variances.

According to the depicted embodiment, the module 12 includes integrally formed crimp holders 112 (e.g., slots) within the interior 62 of the module housing 24 adjacent the front wall 54 thereof. Crimp elements 114 (see FIGS. 14 and 15) crimped to the output pigtail cables 42 are slidably received into the crimp holders 112. Crimp elements 114 include square flanges 116 between which are defined recessed portions 118. The crimp holders 112 include complementary structure to the crimp elements 114 such that once the crimp elements 114 are slidably inserted into the crimp holders 112, the crimp elements 114 are prevented from moving in a longitudinal direction due to the flanges 116. Once slidably inserted, crimp elements 114 are held in place by the cover 38 that is mounted on the module main housing 22. The crimp assembly 120 used for the output cables 42 is illustrated in FIGS. 14 and 15 and discussed in further detail below.

Figure 8A:
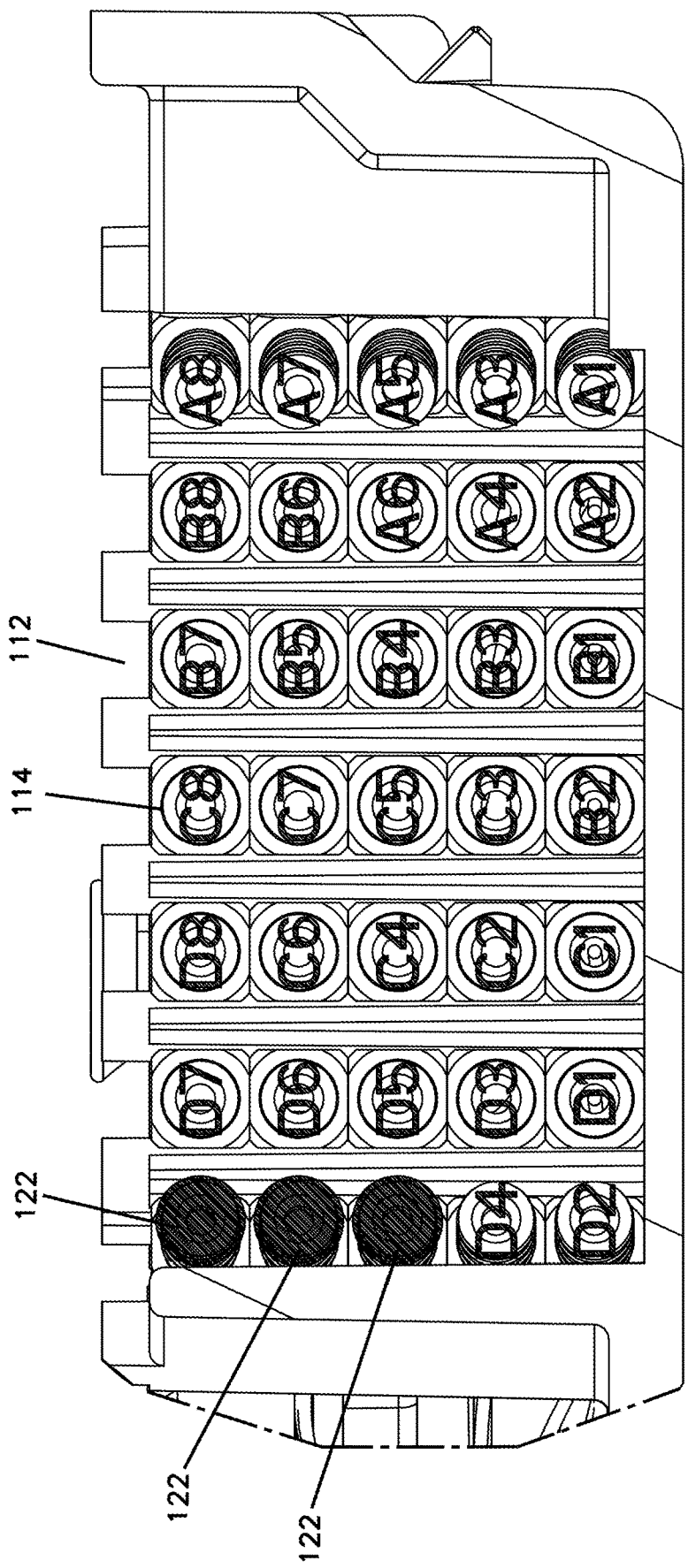
FIG. 8A is a close-up view of the output cable crimp holding portion of the module of FIG. 8.
Figure 9:
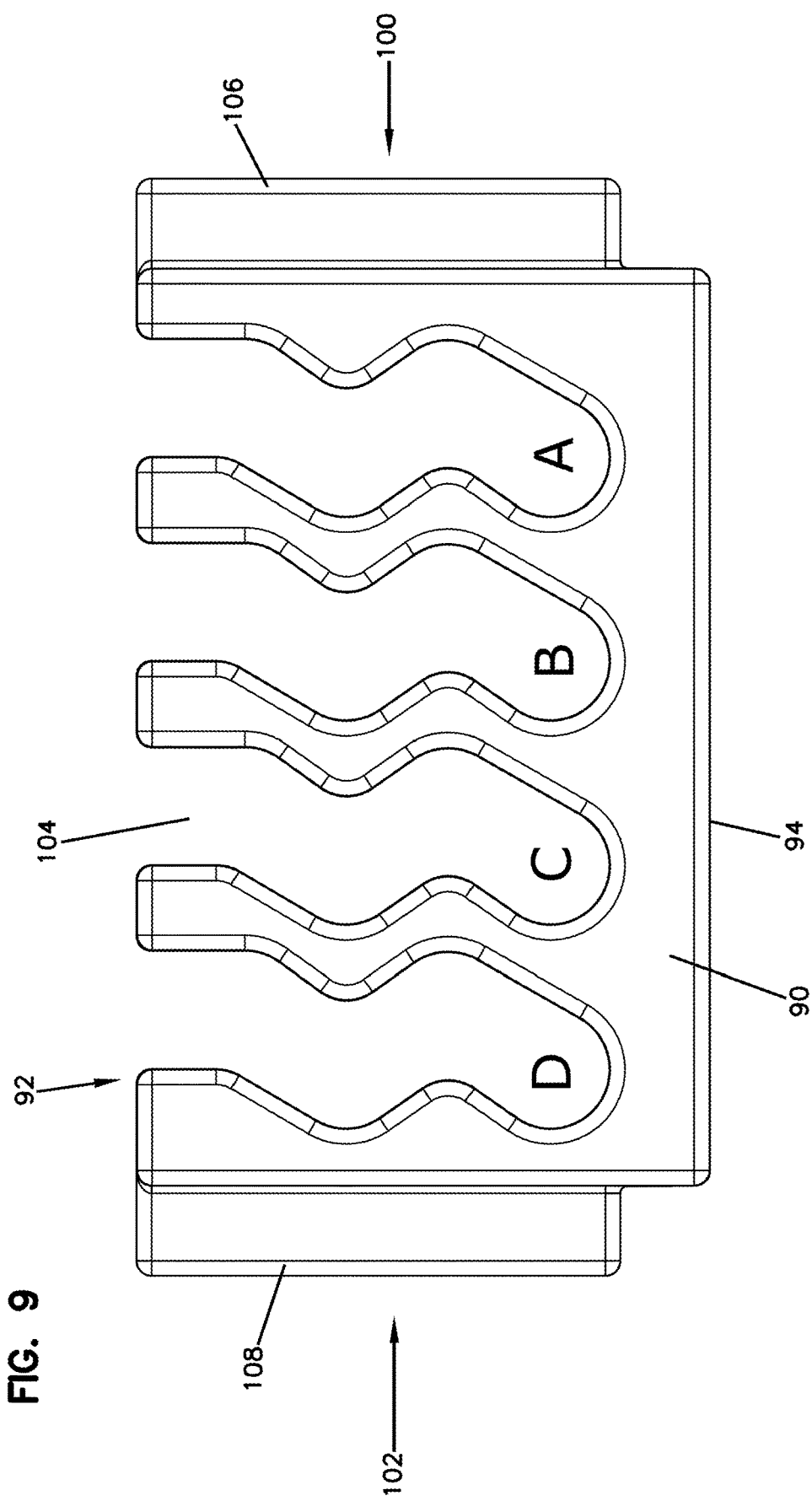
FIG. 9 illustrates a front view of the insect-infestation prevention device of the module of FIG. 8 in isolation.

In the embodiment shown, there are seven crimp holding slots 112, each slot 112 being able to accommodate up to five crimp elements 114 (see FIGS. 8 and 8A). In the embodiment of the module 12 shown, since a 1×32 fiber optic splitter 36 may be used, the crimp holders 112 provide the capacity for all of the thirty-two crimp elements 114 connected to output cables 42. Since only thirty-two crimp holding positions are occupied, the remaining three positions may be filled with dummy crimp elements 122 or inserts/fillers that are not connected to cables, making sure the crimp elements 114 crimped to active output cables 42 do not slide out of the slots 112.

The configuration of the module housing 24 can certainly be modified to accommodate other number of inputs or outputs, as desired. In addition, other complementary shapes between the crimp elements 114, and the crimp holders 112 can be used to provide a slidable fit and to prevent axial movement of the crimp elements 114 within the crimp holders 112.

Referring now to FIGS. 14 and 15, one example of a crimp assembly 120 (i.e., furcation tube assembly) that can be used with the module 12 is illustrated. The crimp assembly 120 includes, as discussed above, a crimp element 114 that defines a front portion with a circumferential notch 118 (i.e., recessed portion) configured to slidably fit to within one of the crimp slots 112 of the module 12 and a rear portion 124 configured to crimp a strength member 48 of the cabling 42. The crimp element 114 defines a central hollow opening through which an inner fiber bearing tube 126 extends. A strength member 48 is shown in FIG. 14 extending between the inner tube 126 and the outer tubing or jacket 128 of the cable 42. Strength member 48, as shown, is an aramid fiber such as Kevlar® but other suitable materials may also be used. Before crimping the strength member 48 to the crimp element 114, the strength member 48 is overlapped onto rear portion 124 of the crimp element 114. A crimp sleeve 130 is fit about the strength member 48 above the rear portion 124 of the crimp element 114 and is crimped to hold these elements together. The outer jacket 128 abuts against the rear end of the crimp sleeve 130.

Figure 16:
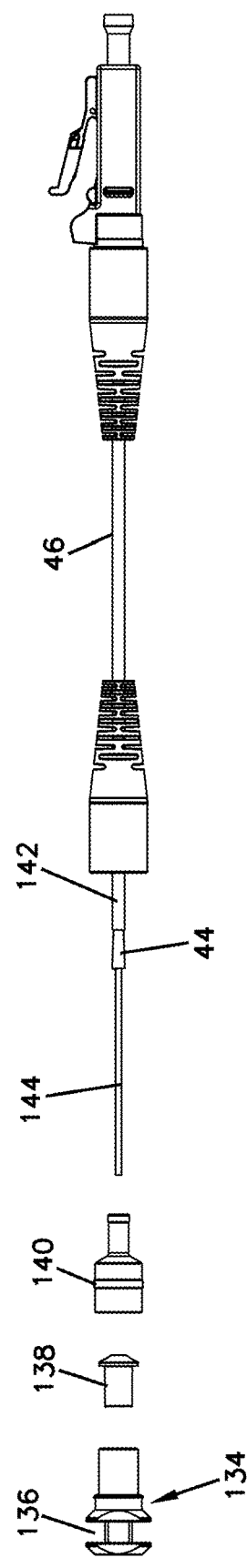
FIG. 16 illustrates an exploded view of an example of a crimp assembly (i.e., furcation tube assembly) that can be used with the input cabling of the module of FIGS. 1-13.
Figure 17:
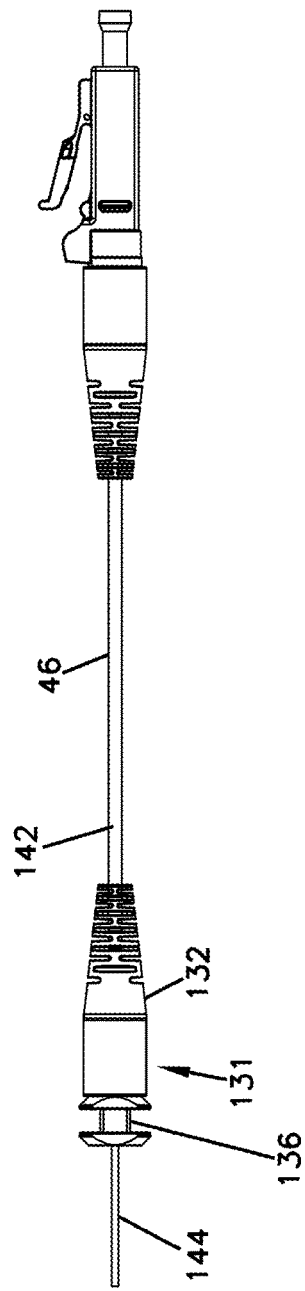
FIG. 17 illustrates the crimp assembly of FIG. 16 in an assembled configuration.

A similar crimp-based fixation assembly 131 is also provided for the signal input location 64. As shown in FIGS. 16 and 17, a strain relief boot 132 is provided that mates with a crimp element 134 for fixing the cabling 46 at the input location 64. The crimp element 134 defines a circumferential notch 136 (i.e., recessed portion). The circumferential notch 136 is slidably inserted into one of the signal input openings 68 defined on the front wall 54 of the main housing portion 22. The crimp element 134 of the input connection is captured by the cover 38 when the cover 38 is mounted on the main housing portion 22.

The crimp assembly 131 at the signal input location 64 further includes an insertion cap 138 that mounts inside a front end of the crimp element 134 and a crimp sleeve 140 that mounts around the exterior of the front end of the crimp element 134. The crimp element 134 is configured to receive, anchor, and provide strain relief/bend radius protection to the fiber optic cable 46 carrying the input signal. The input fiber optic cable 46 includes a jacket 142 surrounding a fiber bearing tube 144. The fiber optic cable 46 also includes the strength layer 44 formed by a plurality of strength members (e.g., reinforcing fibers such as aramid yarn/Kevlar®) positioned between the optical fiber tube 144 and the outer jacket 142. An end portion of the strength layer 44 is crimped between the crimp sleeve 140 and the exterior surface of the front end of the crimp element 134 so as to anchor the strength layer 44 to the crimp element 134. The crimp assembly 131 further includes the strain relief boot 132 mounted at the front end of the crimp element 134, over the crimp sleeve 140, for providing strain relief and bend radius protection to the optical fiber.

The insertion cap 138 reduces the size of the central opening of the crimp element 134 such that the outer tubing or jacket 142 of the cable 46 can abut against the cap 138 as the inner tubing 144 bearing the fiber is inserted through the crimp element 134.

Thus, the cable 46 carrying the input signal and the pigtails 42 carrying the output signals are both fixed to the module housing 24 while the fibers extending therethrough are allowed pass through the housing walls and expand and contract due to thermal variations. The module housing 24, thus, provides an expansion chamber effect for the incoming and outgoing fibers.

Now referring back to FIGS. 5-13, the interior 62 of the main housing portion 22 is divided into two halves or chambers 146, 148 (e.g., a right chamber 146 and a left chamber 148) by a divider wall 150. The right chamber 146 may be considered the cable management and expansion chamber, and the left chamber 148 may be considered the optical equipment or component holding chamber.

Toward the rear wall 52 within the right chamber 146 is positioned a cable management structure in the form of a spool 152 that is integrally formed with the bottom wall 28 of the main housing portion 22. A removably mounted cable retainer 154 is placed over the spool 152 so as to form a dual-layered cable management structure 156 as will be discussed in further detail below.

The cable retainer 154 defines circumferentially placed fingers 158 for retaining the cables around the dual-layered structure 156. When the cable retainer 154 is placed on the spool 152 that is integrally formed with the bottom wall 28 of the main housing portion 22, the fingers 158 fit within notches 160 on the spool 152 to create a dual-layered structure.

The left chamber 148 of the main housing portion 22 is configured to house optical equipment or components for the module 12. As noted above, the depicted module 12 is a fiber optic splitter module and a power splitter 36 is depicted as being housed within the left chamber 148.

It should be noted that the left chamber 148 provides enough spacing to directly mount different types of optical equipment, or, alternatively, receive molded inserts that may have features for mounting different types of optical equipment. In the embodiment shown, the fiber optic splitter 36 is shown as being directly placed within the left chamber 148.

Referring to FIGS. 7, 8, and 10-13, an example of a cable routing path going all the way from the signal input location 64 to the signal output location 66 will now be described, referring to the features of the module 12 that allow management or provide for bend radius protection for such cabling.

FIGS. 7 and 8 illustrate a fully populated module 12 showing all of the cabling associated with the input and output signals. FIGS. 10-13 illustrate the example routing in sequential steps to facilitate understanding of the routing within the module 12.

Figure 10:
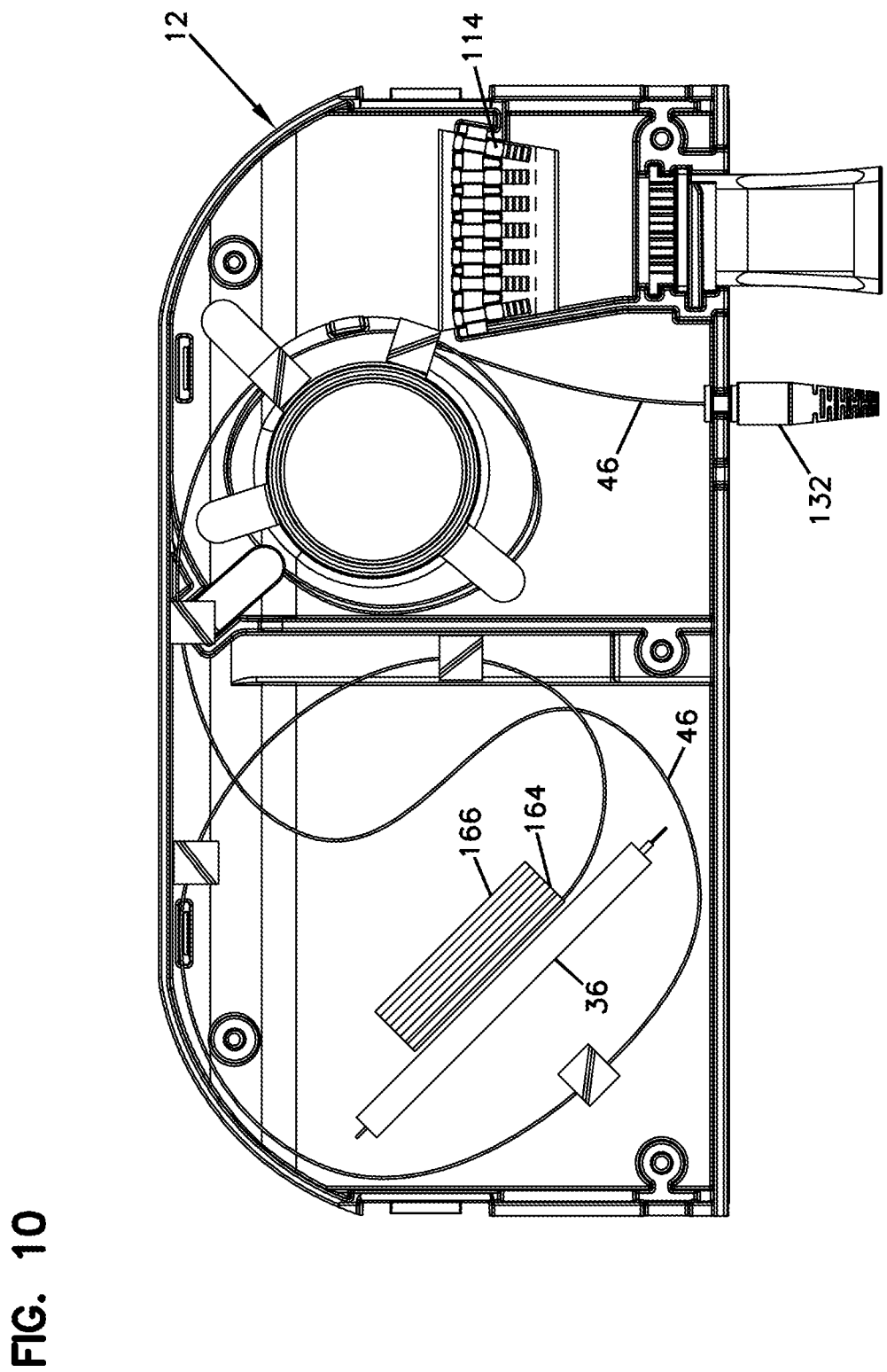
FIGS. 10-13 illustrate the sequential steps for routing cabling associated with an input signal that is split by a fiber optic splitter of the module into a plurality of output signals output from the module.

Now referring to FIG. 10, in the depicted example, a cable 46 carrying the input signal enters the module housing 24 through the signal input opening 68 at the front wall 54 of the main housing portion 22. That cable 46 is wrapped around the dual layer cable management structure 156 twice, with the final wrap ending up on the upper level of the cable management structure 156. The initial wrap of the cable 46 is around the lower portion of the cable management structure 156 that is integrally formed with the bottom wall 28 of the module housing 24, and this wrap allows expansion of the cable within the right chamber 146 of the module housing 24. When the cable 46 passes from the lower level to the upper level of the cable management structure 156, it is routed through a pair of cable holders 162 that limit movement of the cable 46 that is at the upper level of the cable management structure 156.

From the upper level of the cable management structure 156, the cable 46 passes over a notch 163 on the central divider 150 to the left chamber 148 of the module housing 24. After passing to the left chamber 148 of the module housing 24, the cable 46 is routed to follow an S-shaped path and initially extends all the way around the fiber optic splitter 36, through three other cable holders 162 (one being located toward the front and left corner of the module housing 24, the second being located adjacent the rear wall 52 of the housing 24, and the third being located adjacent the divider 150) before being spliced to the splice input side 164 of a splice area 166.

Figure 11:
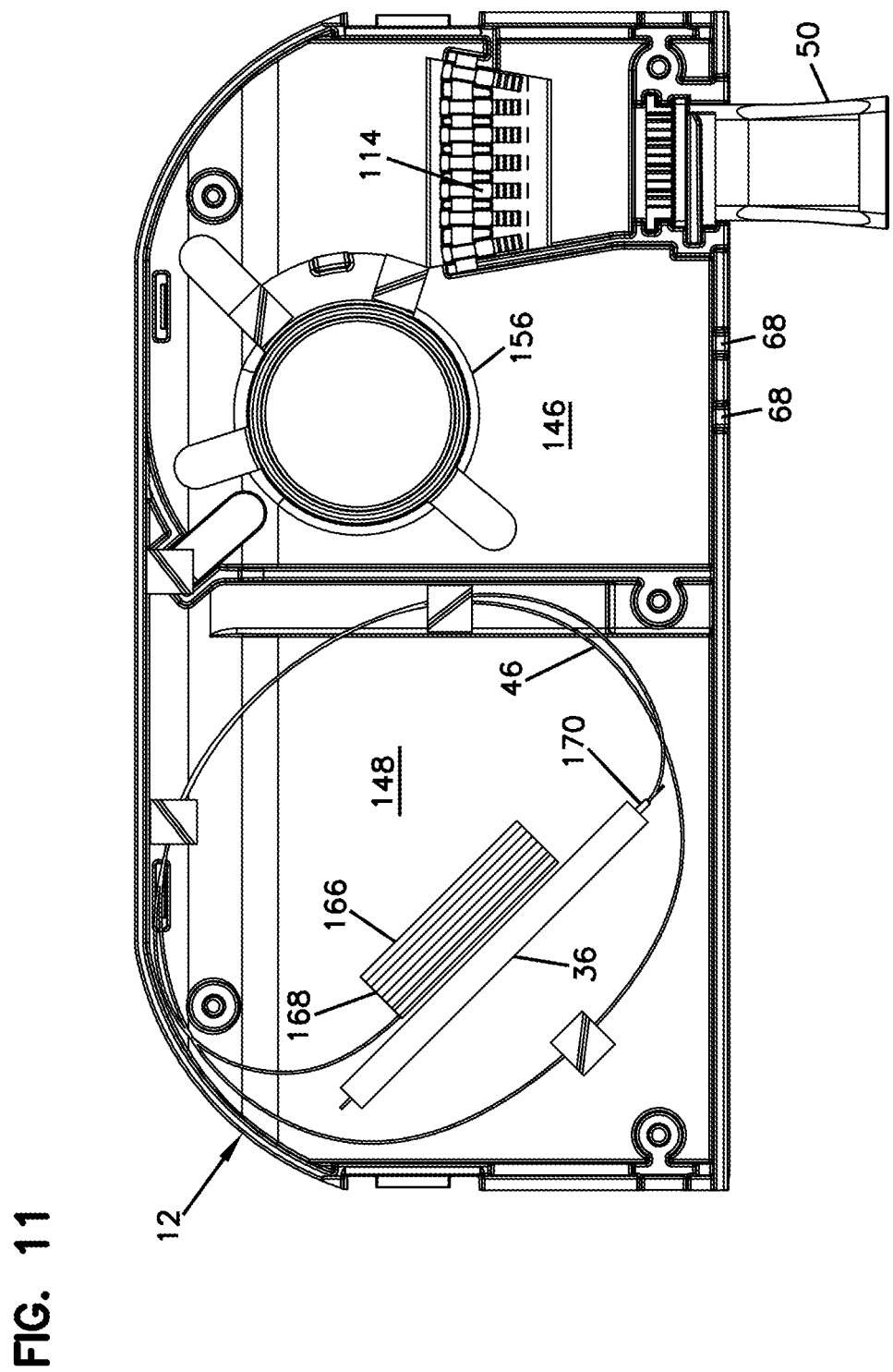

Referring now to FIG. 11, from the splice output side 168 of the splice area 166, the cable 46 carrying the input signal is then routed again all the way around the fiber optic splitter 36 in the left chamber 148, passing through the three cable holders 162, before entering the splitter input side 170 of the fiber optic splitter 36.

Figure 12:
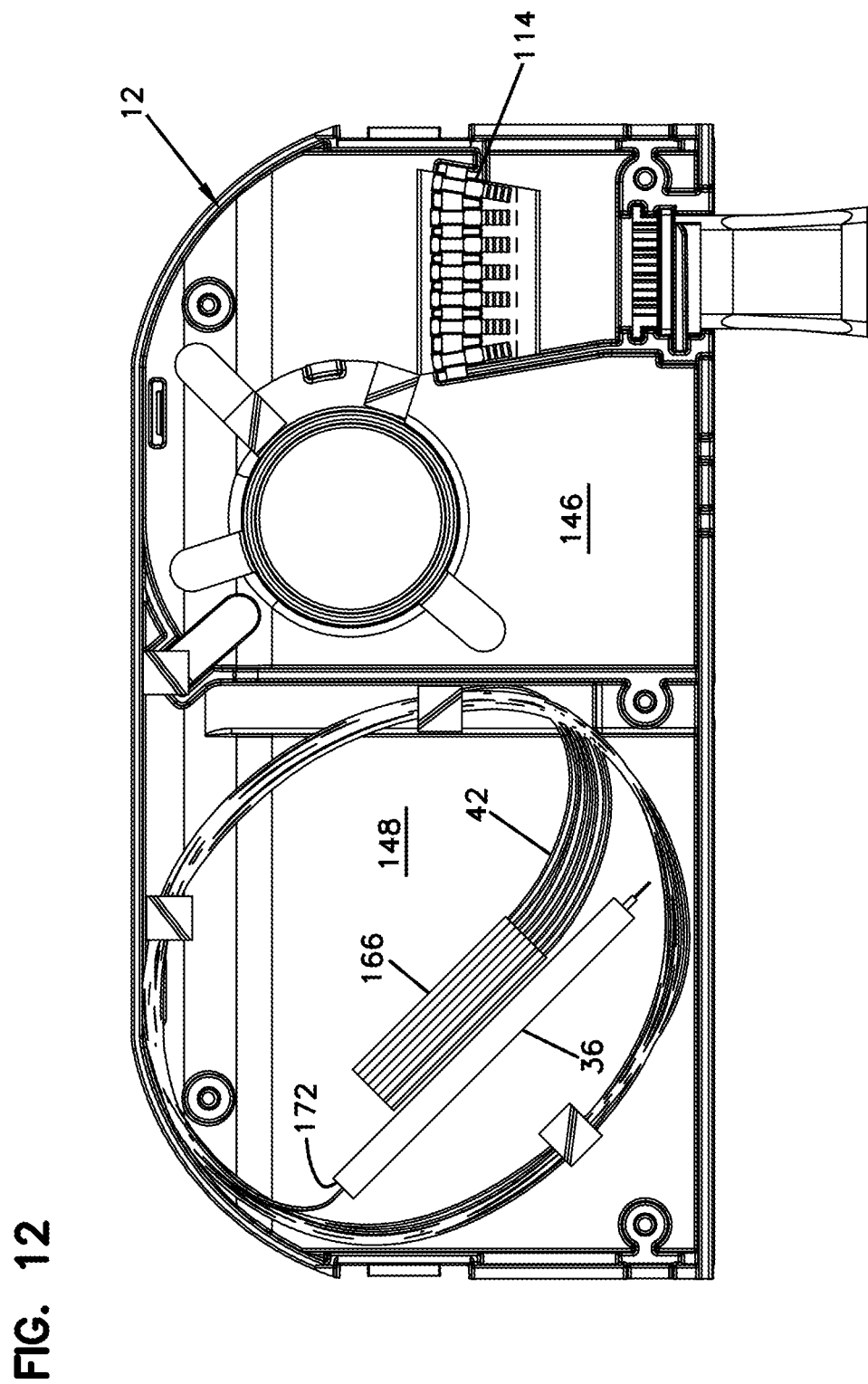

FIG. 12 illustrates the cable routing for the cables 42 that are output from the splitter output side 172 of the fiber optic splitter 36. As shown in FIG. 12, after the cables 42 carrying the output signal leave the output side 172 of the splitter 36, the cables 42 are routed all the way around the left chamber 148, passing through the three cable holders 162, before being led to the splice input side 164 of the splice area 166.

Figure 13:
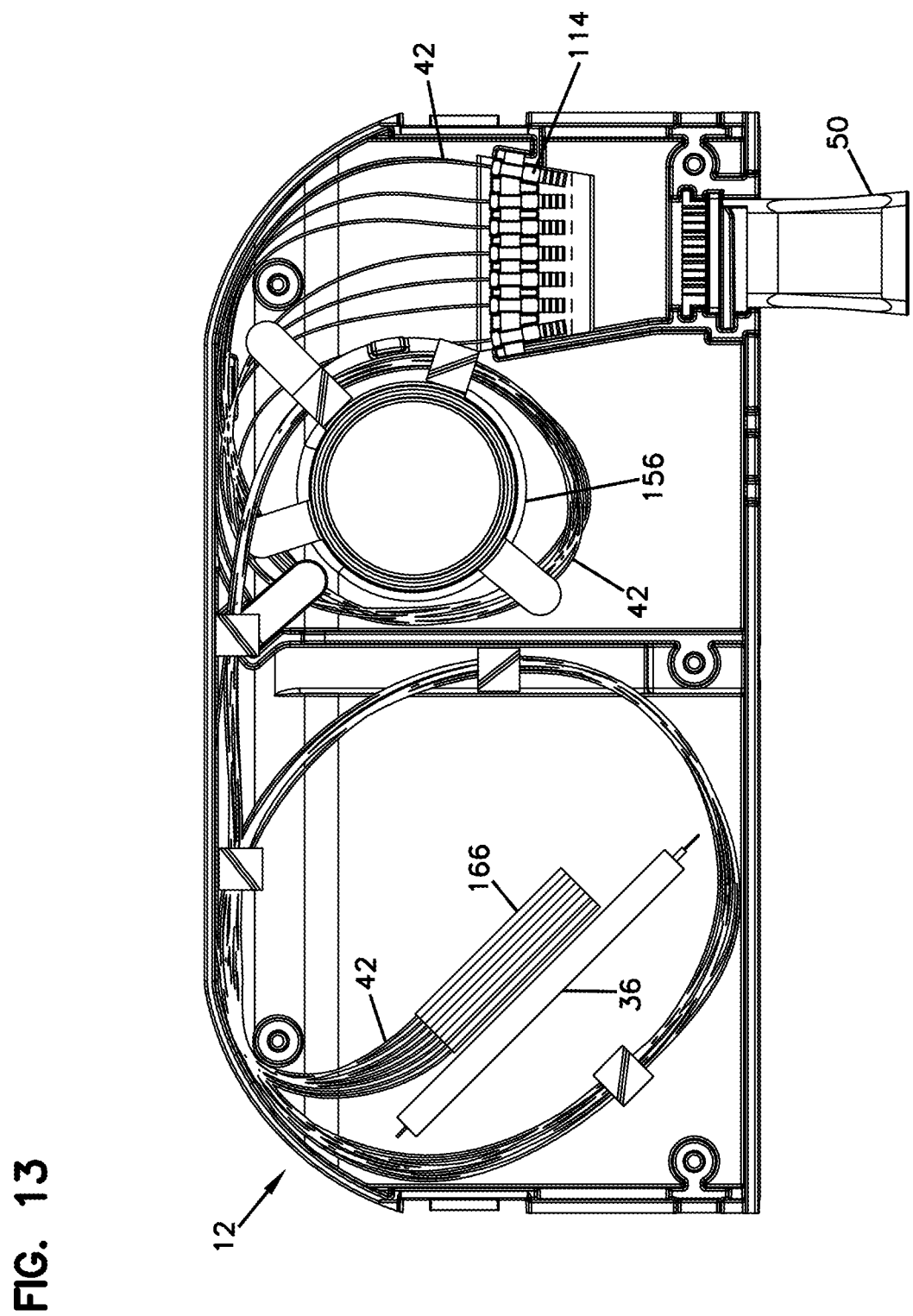

Now referring to FIG. 13, after being spliced to cabling 42 carrying the output signal, the cables 42 are lead from the splice output side 168, all the way around the left chamber 148 again, toward the right chamber 146 of the module housing 24. The cables 42 pass over the divider 150 and are then routed around the cable management structure 156 before being led to the crimp holders 112. As discussed previously, the cables 42 carrying the output signal are crimped via crimp elements 114, and the strength members 48 thereof are fixed to the module housing 24 at the crimp area, before being led out as pigtails 42 from the cable exit boot 50.

FIGS. 7 and 8, as discussed above, show the entire routing for all of the cabling carrying the input and output signals within the module 12.

It should be noted that the depicted cable routing configuration is simply one example of a configuration that can be used within the module 12 given the optical components used therein. Depending upon the type of optical components used within the module 12, the cable management features associated with possible inserts that are configured to hold such components, or the number of signal input openings utilized, the cable routing for the module 12 can be varied.

The above specification, examples and data provide a complete description of the manufacture and use of the disclosure. Since many embodiments of the disclosure can be made without departing from the spirit and scope of the inventive aspects, the inventive aspects resides in the claims hereinafter appended.

What is claimed is:

1. A telecommunications module comprising:
   a housing including a main housing portion defining an interior formed by a first sidewall, a second sidewall, a bottom wall, a front wall, and a rear wall;
   the interior defining a first chamber separated from a second chamber;
   a fiber optic component housed within the second chamber;
   a signal input location for receiving an input signal to be processed by the fiber optic component and a signal output location for exiting an output signal processed by the fiber optic component, wherein at least one of the signal input location and the signal output location is defined by the front wall, wherein a cable carrying the input signal is fixed adjacent the signal input location via a crimp assembly that allows an internal fiber of the cable carrying the input signal to move through a wall of the main housing portion, and a cable carrying the output signal is fixed adjacent the signal output location via a crimp assembly that allows an internal fiber of the cable carrying output signal to move through a wall of the main housing portion, wherein an excess fiber length formed when an outer jacket of the cables contracts more than the fiber therewithin due to temperature variations is accommodated by the first chamber to allow the excess fiber length to accumulate without bending in a radius smaller than a minimum bend radius; and
   a cable management structure positioned within the first chamber, the cable management structure including both the cable carrying the input signal and the cable carrying the output signal wrapped therearound for cable management;
   wherein the cable carrying the input signal and the cable carrying the output signal are passed between the first chamber and the second chamber before and after being processed by the fiber optic component, respectively.

2. A telecommunications module according to claim 1, wherein the fiber optic component is a fiber optic splitter.

3. A telecommunications module according to claim 2, further comprising a splice location adjacent the fiber optic splitter within the second chamber.

4. A telecommunications module according to claim 2, further comprising a plurality of cables carrying output signals that have been split from the input signal by the fiber optic splitter.

5. A telecommunications module according to claim 4, wherein each of the plurality of cables carrying output signals are fixed adjacent the signal output location via crimp assemblies.

6. A telecommunications module according to claim 1, wherein the signal input location is defined by a selectively-exposable opening at the front wall.

7. A telecommunications module according to claim 6, wherein the housing further includes a removable cover mounted to the main housing portion to define a top wall, wherein the cover defines a protrusion extending toward the main housing portion, the protrusion received within the selectively-exposable opening defined on the front wall of the main housing portion when the cover is mounted on the main housing portion, the protrusion of the cover being selectively breakable to expose the opening defined on the front wall of the main housing portion for use as the signal input location.

8. A telecommunications module according to claim 6, wherein the signal input location is defined by at least two selectively-exposable openings at the front wall.

9. A telecommunications module according to claim 1, further comprising an insect-infestation prevention device mounted at the signal output location, the insect-infestation prevention device defining a unitary body with a top end, a bottom end, a front end, a rear end, a right side, and a left side, the unitary body configured as an insert piece for at least partially covering an opening defining the signal output location of the module, the insect-infestation prevention device further defining a plurality of partial cutouts extending generally from the top end toward the bottom end of the body, the cutouts configured to receive cables, each of the cutouts defining a zig-zag configuration for increasing the density of cables that can be stacked within the cutouts in a direction extending from the top end toward the bottom end, and opposing mounting flanges on the right and left sides of the body, respectively.

10. A telecommunications module according to claim 1, wherein the main housing portion defines a divider wall separating the first chamber from the second chamber, the divider wall defining a notch for allowing passage of cables between the first and second chambers.

11. A telecommunications module according to claim 1, wherein the module is configured to be mounted to a telecommunications tray with a snap-fit interlock.

12. A telecommunications module according to claim 1, further comprising a bend limiting boot positioned at the signal output location extending forwardly from the front wall of the main housing portion.

13. A telecommunications module according to claim 1, further comprising a bend limiting boot positioned at the signal input location extending forwardly from the front wall of the main housing portion.

* * * * *